(12) United States Patent
Gruber et al.

(10) Patent No.: US 6,794,810 B2
(45) Date of Patent: Sep. 21, 2004

(54) PHOSPHOR COMPOSITION FOR LOW-PRESSURE GAS DISCHARGE LAMPS

(75) Inventors: Wolfgang Gruber, Augsburg (DE); Matthias Schiplage, Friedberg (DE); Martin Zachau, Geltendorf (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 46 days.

(21) Appl. No.: 10/271,719

(22) Filed: Oct. 17, 2002

(65) Prior Publication Data

US 2003/0076029 A1 Apr. 24, 2003

(30) Foreign Application Priority Data

Oct. 23, 2001 (DE) .......................................... 101 52 217

(51) Int. Cl.$^7$ ............................. H01J 1/62; H01J 63/04; C09K 11/00
(52) U.S. Cl. ........................ 313/487; 313/486; 313/485; 252/301.4 R; 252/301.6 R; 252/301.4 H
(58) Field of Search .................................. 313/483, 485, 313/486, 487, 489, 63; 252/301.4 R, 301.4 P, 301.4 H, 301.6 P, 301.4 F, 301.6 F

(56) References Cited

U.S. PATENT DOCUMENTS

| | | | | |
|---|---|---|---|---|
| 5,422,538 A | * | 6/1995 | Ouwerkerk et al. | ........ 313/486 |
| 5,684,359 A | * | 11/1997 | Yano et al. | .................. 313/487 |
| 5,834,100 A | * | 11/1998 | Marks et al. | ................ 313/504 |
| 6,380,669 B1 | * | 4/2002 | Zachau et al. | ........ 252/301.4 R |
| 6,452,324 B1 | * | 9/2002 | Soules et al. | ................ 313/486 |
| 6,459,197 B1 | * | 10/2002 | Mori et al. | .................. 313/487 |
| 6,489,716 B1 | * | 12/2002 | Tews et al. | .................. 313/486 |
| 6,525,460 B1 | * | 2/2003 | Soules et al. | ......... 252/301.4 R |
| 6,616,862 B2 | * | 9/2003 | Srivastava et al. | .... 252/301.4 P |
| 2003/0155857 A1 | * | 8/2003 | Soules et al. | ................ 313/487 |

* cited by examiner

Primary Examiner—Nimeshkumar D. Patel
Assistant Examiner—Mariceli Santiago
(74) Attorney, Agent, or Firm—Robert F. Clark

(57) ABSTRACT

The phosphor composition for low-pressure gas discharge lamps with a high light efficiency for generating radiation with a color temperature of greater than 5000 K and a very good general color rendering index Ra of greater than 90 includes at least one halophosphate phosphor, a phosphor which emits in the red wavelength region and a phosphor which emits in the blue-green wavelength region. In addition, according to the invention the phosphor composition contains an Eu-doped barium magnesium aluminate phosphor $BaMgAl_{10}O_{17}$:Eu and a Tb-doped green-emitting phosphor.

19 Claims, 1 Drawing Sheet

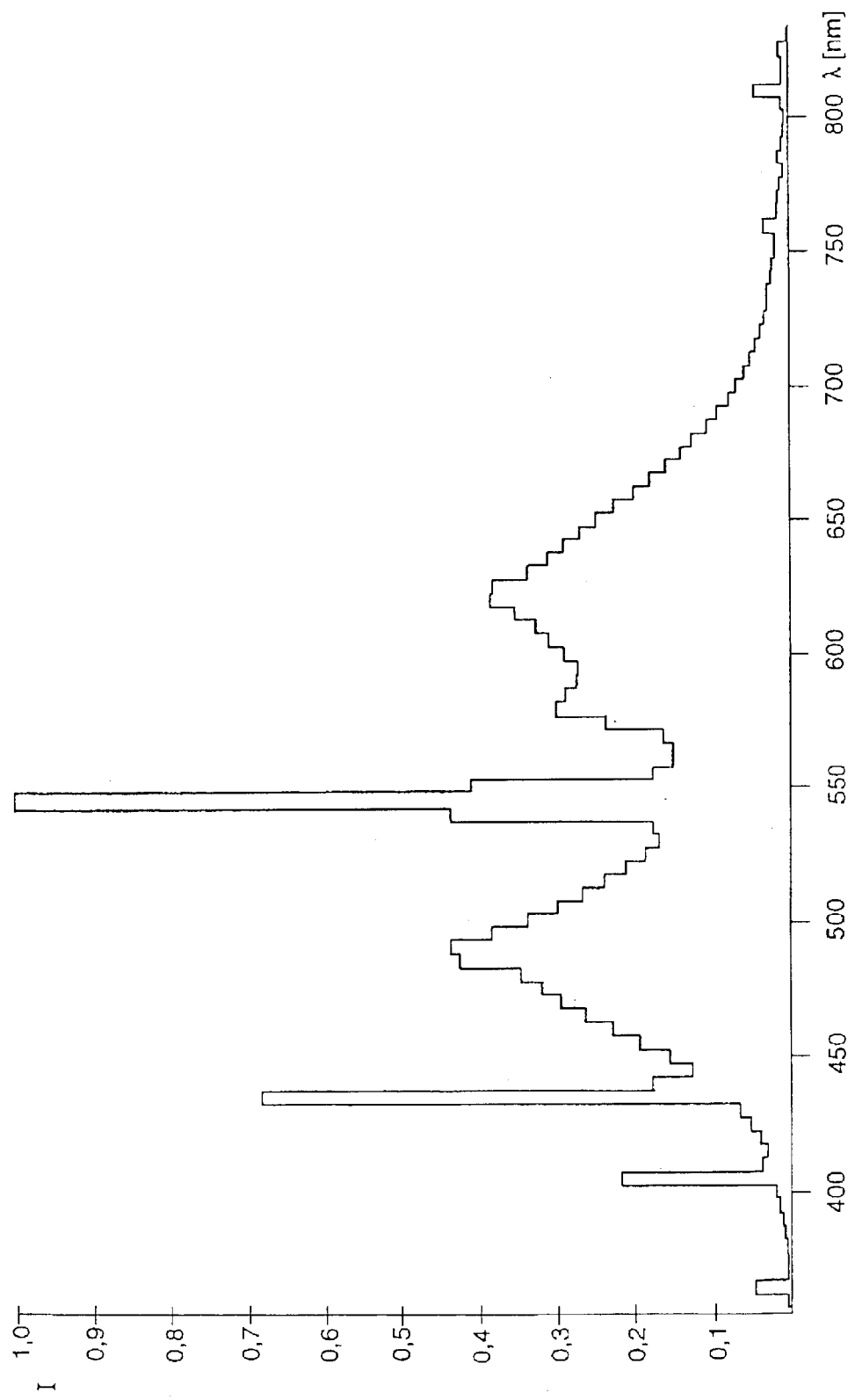

PHOSPHOR COMPOSITION FOR LOW-PRESSURE GAS DISCHARGE LAMPS

TECHNICAL FIELD

The invention is based on a phosphor composition for low pressure gas discharge lamps for generating light with a color temperature of greater than 5000 K and a very good general color rendering index Ra of greater than 90, containing at least one halophosphate phosphor, a phosphor which emits in the red wavelength region and a phosphor which emits in the blue-green wavelength region.

BACKGROUND ART

In addition to the requirement for a very good color rendering, in such cases the light flux must be as high as possible. The difficulty in this context is that high light flux and very good color rendering are contradictory requirements, since a high light flux requires a maximum light intensity in the green, but a good color rendering presupposes a distribution of the light intensity which is similar to the black-body radiation at all wavelengths, and is therefore contradictory to the first requirement.

DISCLOSURE OF THE INVENTION

It is an object of the present invention to provide a phosphor composition containing at least one halophosphate phosphor, a phosphor which emits in the red wavelength region and a phosphor which emits in the blue-green wavelength region, with which, in low-pressure gas discharge lamps, it is possible to achieve maximum light efficiencies combined, at the same time, with a very good general color rendering index Ra of greater than 90 and a color temperature of greater than 5000 K. Moreover, it should be possible for the phosphor composition to be applied to the discharge vessel in one single layer.

This object is achieved by a phosphor composition containing beside the at least one halophosphate phosphor, the phosphor which emits in the red wavelength region and the phosphor which emits in the blue-green wavelength region additionally an Eu-doped barium magnesium aluminate phosphor $BaMgAl_{10}O_{17}$:Eu and a Tb-doped green-emitting phosphor.

The required features concerning the color temperature of greater than 5000 K and the general color rendering index Ra of greater than 90 are very well fulfilled as a result of the additional use of an Eu-doped barium magnesium aluminate phosphor $BaMgAl_{10}O_{17}$:Eu and of a Tb-doped green-emitting phosphor in the phosphor composition.

The proportion by weight of the Eu-doped barium magnesium aluminate phosphor $BaMgAl_{10}O_{17}$:Eu in the overall phosphor composition is advantageously between 1% and 20%, preferably between 3% and 15%.

A particularly suitable Tb-doped green-emitting phosphor is a Tb-doped cerium magnesium aluminate phosphor $CeMgAl_{11}O_{19}$:Tb. The proportion by weight of the Tb-doped cerium magnesium aluminate phosphor $CeMgAl_{11}O_{19}$:Tb in the overall phosphor composition should be between 1% and 20%, advantageously between 2% and 15%.

To further improve the color rendering, the phosphor of the phosphor composition which emits in the blue-green radiation region should be an Eu-doped strontium aluminate phosphor $Sr_4Al_{14}O_{25}$:Eu, the proportion by weight of the Eu-doped strontium aluminate phosphor $Sr_4Al_{14}O_{25}$:Eu in the overall phosphor composition advantageously being between 10% and 50%, preferably between 20% and 40%.

Further improvements with regard to the color rendering can be achieved by adding an Mn-doped cerium gadolinium zinc magnesium pentaborate phosphor (Ce,Gd)(Zn,Mg)$B_5O_{10}$:Mn for the phosphor which emits in the red radiation region, in which case this phosphor should form from 5% to 60%, preferably from 10% to 40%, of the overall phosphor composition.

A particularly suitable halophosphate phosphor for the features required here is an Mn-doped calcium halophosphate phosphor $Ca_5(PO_4)_3(F,Cl)$:Sb,Mn.

In addition, the phosphor composition may contain one or more phosphors which emit in the invisible spectral region. In this way, the phosphor composition can be approximate to the spectrum of the sun with regard to its UV component.

The phosphor composition is preferably applied to the inner side of the discharge vessel in the form of a single phosphor mixture and in this case comprises a single layer.

However, it may also be advantageous for the phosphor coating to be applied in the form of two layers, in which case the lower layer, which faces the inner side of the discharge vessel, consists only of the halophosphate phosphor. The covering layer, which faces the discharge, should then likewise contain the halophosphate phosphor, and also the other phosphors of the phosphor mixture.

In addition, a protective layer comprising $Al_2O_3$, $Y_2O_3$ or a rare-earth oxide should be applied between the inner side of the discharge vessel and the phosphor layer.

BRIEF DESCRIPTION OF THE DRAWINGS

The FIGURE is an illustration of the spectrum of a fluorescent lamp having a phosphor coating according to this invention.

BEST MODE FOR CARRYING OUT THE INVENTION

The FIGURE which follows illustrates the spectrum of a fluorescent lamp with a phosphor coating, the coating being composed of a phosphor mixture with the following constituents, in % by weight:

| | |
|---|---|
| $Sr_4Al_{14}O_{25}$:Eu | 28.5% by weight |
| (Ce, Gd) (Zn, Mg)$B_5O_{10}$:Mn | 28.5% by weight |
| $Ca_5(PO_4)_3$(F, Cl):Sb, Mn | 26.9% by weight |
| $BaMgAl_{10}O_{17}$:Eu | 6.1% by weight |
| $CeMgAl_{11}O_{19}$:Tb | 10.0% by weight |

The intensity I (maximum intensity standardized to 1) of the radiation is in this case shown as a function of the wavelength λ in nm, in 5 nm steps. With this phosphor mixture, it is possible to achieve a high light efficiency of 62 lm/W. None of the special color rendering factors R1 to R16 has a value of less than or equal to 92, with a general color rendering factor Ra8 for the first eight rendering factors R1 to R8 of 96.3 and Ra14 for the first fourteen rendering factors R1 to R14 of 95.9. The coordinates of the color locus for this phosphor mixture are x=0.334 and y=0.351.

What is claimed is:

1. A phosphor composition for low-pressure gas discharge lamps with a high light efficiency for generating radiation with a color temperature of greater than 5000 K and a very good general color rendering index Ra of greater than 90, the phosphor composition containing at least one halophosphate phosphor, a phosphor which emits in the red wavelength region and a phosphor which emits in the blue-green wavelength region and additionally an Eu-doped barium magnesium aluminate phosphor $BaMgAl_{10}O_{17}$:Eu and a Tb-doped green-emitting phosphor.

2. The phosphor composition as claimed in claim 1, in that the proportion by weight of the Eu-doped barium magnesium aluminate phosphor $BaMgAl_{10}O_{17}$:Eu in the overall phosphor composition is between 1% and 20%.

3. The phosphor composition as claimed in claim 1, in that the proportion by weight of the Eu-doped barium magnesium aluminate phosphor $BaMgAl_{10}O_{17}$:Eu in the overall phosphor composition is between 3% and 15%.

4. The phosphor composition as claimed in claim 1, in that the phosphor composition, for the phosphor which emits in the blue-green spectral region, contains an Eu-doped strontium aluminate phosphor $Sr_4Al_{14}O_{25}$:Eu.

5. The phosphor composition as claimed in claim 4, in that the proportion by weight of the Eu-doped strontium aluminate phosphor $Sr_4Al_{14}O_{25}$:Eu in the overall phosphor composition is between 10% and 50%.

6. The phosphor composition as claimed in claim 4, in that the proportion by weight of the Eu-doped strontium aluminate phosphor $Sr_4Al_{14}O_{25}$:Eu in the overall phosphor composition is between 20% and 40%.

7. The phosphor composition as claimed in claim 1, in that the Tb-doped green-emitting phosphor is a Tb-doped cerium magnesium aluminate phosphor $CeMgAl_{11}O_{19}$:Tb.

8. The phosphor composition as claimed in claim 7, in that the proportion by weight of the Tb-doped cerium magnesium aluminate phosphor $CeMgAl_{11}O_{19}$:Tb in the overall phosphor composition is between 1% and 20%.

9. The phosphor composition as claimed in claim 7, in that the proportion by weight of the Tb-doped cerium magnesium aluminate phosphor $CeMgAl_{11}O_{19}$:Tb in the overall phosphor composition is between 2% and 15%.

10. The phosphor composition as claimed in claim 1, in that the phosphor composition contains, for the phosphor which emits in the red spectral region, an Mn-doped cerium gadolinium zinc magnesium pentaborate phosphor (Ce,Gd)(Zn,Mg)$B_5O_{10}$:Mn.

11. The phosphor composition as claimed in claim 10, in that the proportion by weight of the Mn-doped cerium gadolinium zinc magnesium pentaborate phosphor (Ce,Gd)(Zn,Mg)$B_5O_{10}$:Mn in the overall phosphor composition is between 5% and 60%.

12. The phosphor composition as claimed in claim 10, characterized in that the proportion by weight of the Mn-doped cerium gadolinium zinc magnesium pentaborate phosphor (Ce,Gd)(Zn,Mg)$B_5O_{10}$:Mn in the overall phosphor composition is between 10% and 40%.

13. The phosphor composition as claimed in claim 1 in that the phosphor composition, as halophosphate phosphor, contains an Sb- and Mn-doped calcium halophosphate phosphor $Ca_5(PO_4)_3$(F,Cl):Sb,Mn.

14. The phosphor composition as claimed in claim 1 in that the phosphor composition additionally contains one or more phosphors which emit in the invisible spectral region.

15. The phosphor composition as claimed in claim 1, in that the proportion by weight of the Eu-doped barium magnesium aluminate phosphor $BaMgAl_{10}O_{17}$:Eu in the overall phosphor composition is between 1% and 20%, and the Tb-doped green-emitting phosphor is a Tb-doped cerium magnesium aluminate phosphor $CeMgAl_{11}O_{19}$:Tb.

16. The phosphor composition as claimed in claim 15 wherein the proportion by weight of the Tb-doped cerium magnesium aluminate phosphor $CeMgAl_{11}O_{19}$:Tb in the overall phosphor composition is between 1% and 20%.

17. The phosphor composition as claimed in claim 16 wherein the phosphor which emits in the red spectral region is an Mn-doped cerium gadolinium zinc magnesium pentaborate phosphor (Ce,Gd)(Zn,Mg)$B_5O_{10}$:Mn, and the phosphor which emits in the blue-green spectral region is an Eu-doped strontium aluminate phosphor $Sr_4Al_{14}O_{25}$:Eu.

18. The phosphor composition as claimed in claim 17 wherein the proportion by weight of the Mn-doped cerium gadolinium zinc magnesium pentaborate phosphor (Ce,Gd)(Zn,Mg)$B_5O_{10}$:Mn in the overall phosphor composition is between 5% and 60%, and the proportion by weight of the Eu-doped strontium aluminate phosphor $Sr_4Al_{14}O_{25}$:Eu in the overall phosphor composition is between 10% and 50%.

19. The phosphor composition as claimed in claim 18 wherein the halophosphate phosphor is an Sb- and Mn-doped calcium halophosphate phosphor $Ca_5(PO_4)_3$(F,Cl):Sb,Mn.

* * * * *